Figure 1:
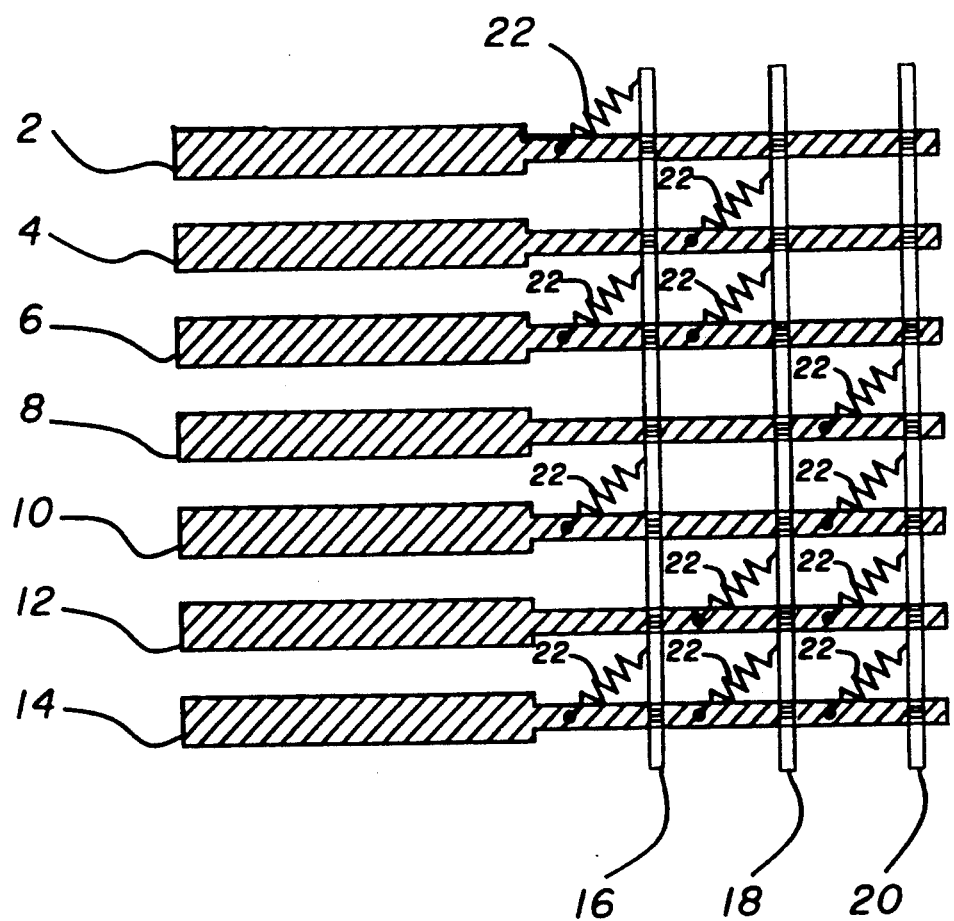

United States Patent [19]
Holcroft

[11] Patent Number: 5,187,330
[45] Date of Patent: Feb. 16, 1993

[54] POSITIONAL DETERMINATION

[75] Inventor: Brian Holcroft, High Wycombe, England

[73] Assignee: Thorn EMI plc, London, England

[21] Appl. No.: 745,342

[22] Filed: Aug. 15, 1991

[30] Foreign Application Priority Data

Aug. 18, 1990 [GB] United Kingdom ............... 9018201

[51] Int. Cl.$^5$ .............................................. G08C 21/00
[52] U.S. Cl. ....................................... 178/18; 382/13; 310/339; 310/366
[58] Field of Search ................ 178/18, 19, 20; 382/3, 382/11, 13; 310/331, 339, 366

[56] References Cited
U.S. PATENT DOCUMENTS
4,581,482  4/1986 Rothfjell ............................ 178/18

FOREIGN PATENT DOCUMENTS
441567  8/1991 European Pat. Off. .
1229349  4/1971 United Kingdom .

Primary Examiner—Stafford D. Schreyer
Attorney, Agent, or Firm—Keck, Mahin & Cate

[57] ABSTRACT

A system for positional determination includes an array of piezoelectric sensor electrodes connected to an array of output lines via resistors for providing a binary code in response to activation of the sensor electrodes; and an array of further output lines also connected to the array of sensor electrodes via resistors for providing a binary error code in response to activation of the sensor electrodes. By combining the resultant binary code and binary error code, an accurate determination of the position along the array of activation of the sensor electrodes may be achieved.

12 Claims, 4 Drawing Sheets

| SINGLE ELECTRODE ACTIVATION | | | ADJACENT ELECTRODE ACTIVATION | | |
|---|---|---|---|---|---|
| ELECTRODE NUMBER | OUTPUT LINES | ERROR LINES | ELECTRODE COMBINATION | OUTPUT LINES | ERROR LINES |
| 2 | 001 | 01 | •1 + •2 | 011 | 01 |
| 4 | 011 | 00 | •2 + •3 | 011 | 10 |
| 6 | 010 | 10 | •3 + •4 | 110 | 11 |
| 8 | 110 | 01 | •4 + •5 | 111 | 01 |
| 10 | 111 | 00 | •5 + •6 | 111 | 10 |
| 12 | 101 | 10 | •6 + •7 | 101 | 11 |
| 14 | 100 | 11 | | | |

FIG. 4

POSITIONAL DETERMINATION

The present invention relates to a method and apparatus for the determination of position of an element and has particular, though not exclusive, relevance to positional determination as applied to signature verification devices.

The applicants co-pending British Patent Application No. 9002783.0 discloses a pressure-sensitive device employed in a signature verification system. The system employs piezoelectric strips to determine the position of a writing stylus during signature. A shortcoming of the system may occur if the stylus is positioned intermediate two strips and the system may not be able to accurately determine the stylus' position.

One solution to this problem has been disclosed in GB No. 1229349 which uses N matrices to each of which every Nth line is connected so that if N adjacent lines are energised simultaneously, each produces a correct Gray code which overcomes the problems of indeterminate position by changing only one bit at a time—and the N codes are then averaged. This system, however, involves the use of complex and relatively expensive analogue-to-digital circuitry.

It is thus an object of the present invention to provide a method and apparatus for positional determination in which the aforementioned problems are at least alleviated.

According to a first aspect of the present invention there is provided a method of positional determination, the method comprising; activating at last one of an array of sensor electrodes thereby to generate a binary code and a binary error code for each sensor activated; and when two or more sensors are activated simultaneously, combining the binary codes for each activated sensor and combining the error codes for each activated sensor to produce a further code for uniquely defining the position of activation of the activated sensors in the array. Thus, by the inclusion of a binary error code the possibility of confusion arising over the position of the stylus is alleviated.

Preferably the binary code is a Gray code. Thus only one bit of information changes as the stylus moves from one sensor electrode to the next.

Preferably, the error code enables positional determination to within one-half of the sensor electrode pitch.

Preferably, the signals produced are electric signals produced from piezoelectric sensors.

According to a second aspect of the present invention there is provided a system for positional determination, the system comprising an array of sensor electrodes each for providing electrical signals when activated; processing means for producing from the electrical signals from each activated sensor a binary code indicative of the activated sensor and a binary error code; and further processing means for combining, when two or more sensors are activated simultaneously, the binary codes and the binary error codes for the two or more activated sensors thereby to provide a further code for uniquely defining the position of activation of electrical sensors in the array.

Figure 2:
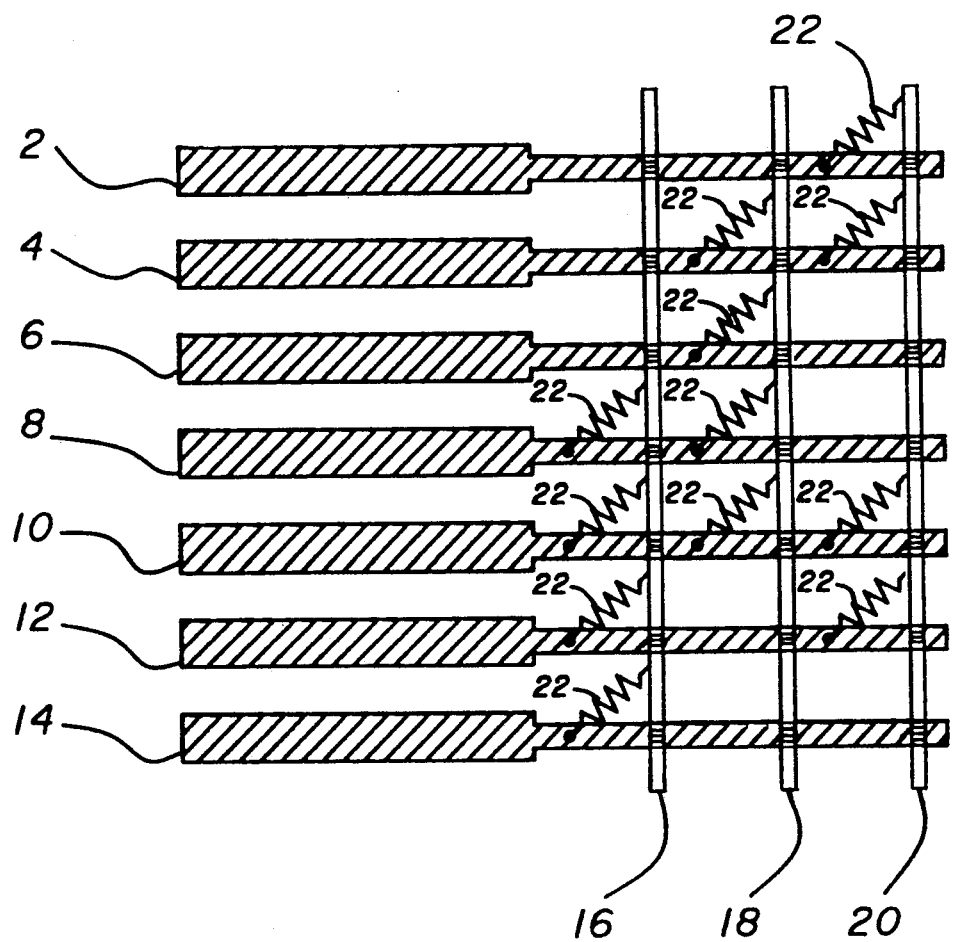
Figure 3:
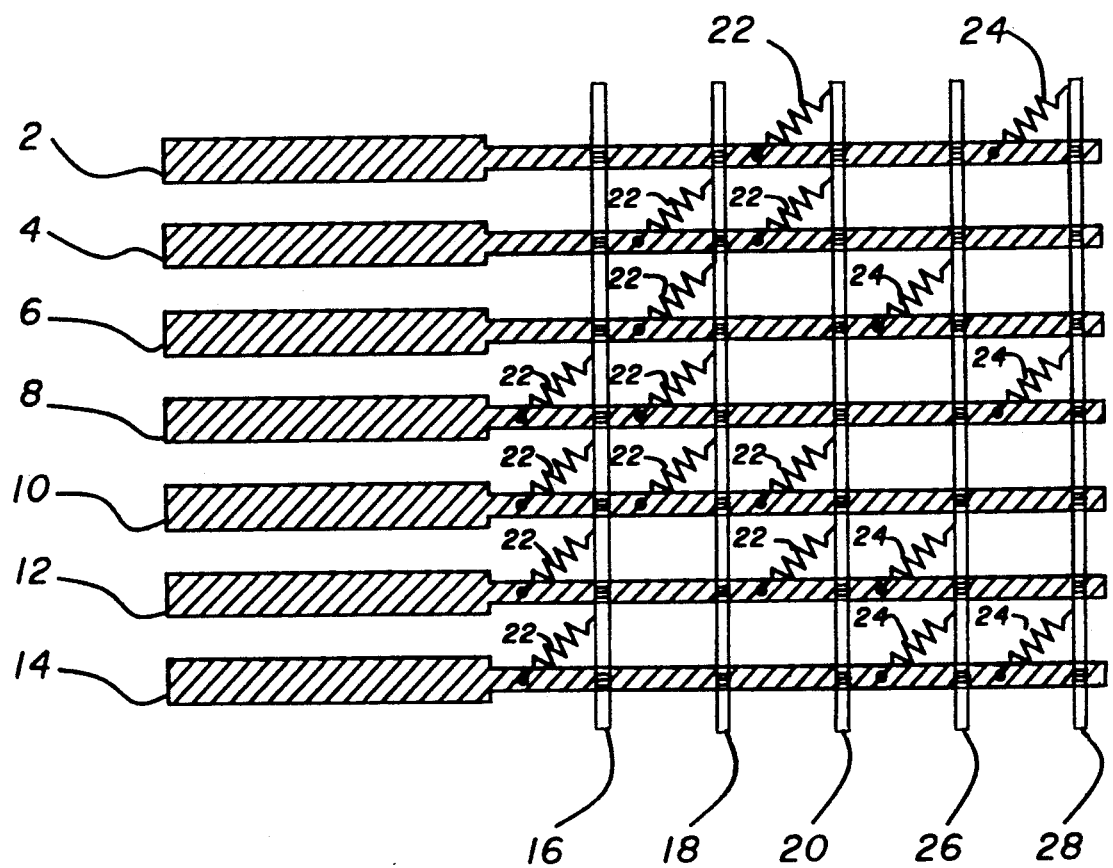

The invention will now be described, by way of example only, with reference to the following drawings, of which FIG. 1 shows a schematic representation of a seven sensor electrode array with binary format interconnections, and FIG. 2 shows a schematic representation of a seven sensor electrode array with Gray code interconnections, and FIG. 3 shows a schematic representation of a seven sensor electrode array having a binary format coding system and interconnects using a Gray code allocation and error code connections, and FIG. 4 shows the truth table associated with FIG. 3.

In the following description, the example given is that of the signature verification device of the applicants co-pending GB Application No. 9002783.0, however, it will be appreciated that this is merely illustrative of the benefits which may be achieved by employing the present invention, and that the invention has broader applications than just signature verification.

With reference firstly to FIG. 1, the position of a writing stylus may be determined by using a suitable combination of parallel electrode strips, piezoelectric layers and a common electrode. These are combined to give the array of sensing electrodes 2, 4, 6, 8, 10, 12, 14. During a writing process, a stylus excerts a force on the sensor electrodes 2, 4, 6, 8, 10, 12, 14, which creates a piezoelectric charge. The sensor electrodes 2, 4, 8, 10, 12, 14 are connected in a binary manner, forming a processing means, to one or more output lines 16, 18, 20, via suitable resistors 22, and the charge is detected by this circuitry.

The binary codes present on the output lines 16, 18, 20 uniquely determine the stylus' position with respect to the sensing electrodes 2, 4, 6, 8, 10, 12, 14. This is illustrated by considering the movement of a stylus over the sensing electrodes in the order 2, 4, 6, 8, 10, 12 and 14. It will be seen that output line 16 represents the least significant bit of the binary code, and output line 20 the most significant bit. Thus, as the stylus moves, a binary code output representing the number sequence 1–7 is achieved. If only one sensor electrode is capable of being operated at any given time, then a higher spatial resolution may be achieved by reducing the sensor electrode pitch. However, in practice, when the sensor electrode pitch is reduced too much, then two or more sensor electrodes 2, 4, 6, 8, 10, 12, 14 are activated simultaneously by the stylus action.

The effect this has is illustrated by considering a stylus midway between, and activating both, sensor electrodes 6 and 8. The binary code output for sensor electrode 6 is 110 and the binary code output for sensor electrode 8 is 001. The combination of these two when activated simultaneously is 111—which corresponds to the stylus activating sensor electrode 14 solely. Thus the resultant binary output gives false positional information.

The above problem may be alleviated somewhat by employing a Gray code as the binary output codes. Such codes are well known to those skilled in this art. One example of a Gray code is illustrated by reference to FIG. 2.

The salient feature of this Gray code is that as the stylus moves from one sensor electrode 2, 4, 6, 8, 10, 12, 14 to the next, only one bit of binary information changes. Thus, by considering once again the action of the stylus being midway between, and activating both, sensor electrodes 6 and 8, the binary outputs are respectively 010 and 110—giving in combination a binary output of 110, which corresponds to sensor electrode 8. Whilst this is an improvement on the previous binary code, it is still a code which is limited to the electrode pitch. It is important to note that the Gray code system of encoding is not capable of accommodating the simultaneous activation of three or more sensor electrodes, and that multiple sensor electrode activation will place a lower practical limit on the electrode pitch dimension.

By now referring to FIGS. 3 and 4 it will be seen that by the addition of two binary error output lines, the stylus position may be determined with an improved resolution of one-half the sensor electrode pitch.

The sensor electrodes 2, 4, 6, 8, 10, 12, 14 are connected to the binary code lines 16, 18, 20 using the Gray code allocation of resistors 22 as is shown in FIG. 2. The sensor electrodes 2, 4, 6, 8, 10, 12, 14 are further connected via resistors 24 to the binary error code lines 26, 28. Thus it can be seen that, for example, sensor electrode 12 is connected via resistors 22 to binary code lines 16 and 20 and also via resistor 24 to binary error code line 26.

FIG. 4 clearly illustrates the resultant outputs as the stylus moves over the sensing electrodes and activates them either singularly (single electrode activation column) or dually adjacent electrode activation column). In FIG. 4, a "1" indicates a resistive connection between the sensing electrode and the output line, and "0" represents no connection.

By considering specifically sensor electrodes 2, 4 and 6 and their respective output codes 001 011, and 010 the effectiveness of the error codes may be demonstrated.

If a stylus rests midway between sensor electrodes 2 and 4, then by performing an OR operation on their output codes, 001 and 011, a resultant output code of 011 is obtained. This does not resolve the position of the stylus. However, if now the same OR operation is performed on the initially arbitrarily chosen error codes of 01 and 00, a resultant error code of 01 is achieved. It can easily be seen that by employing a further processing means to combine the binary code with the binary error code, the final output plus error code of 011 01 uniquely represents a stylus position between sensor electrodes 2 and 4.

Although initially the error codes are chosen arbitrarily, four possible codes exist; 00, 01, 10 and 11. By using these four possible codes in an OR operation, precise positional determination is clearly possible.

It will be apparent to those skilled in the art that whilst in the example described herebefore piezoelectric signals are used to generate positional information, the invention may equally well be applied to any other situation in which positional determination maybe a requirement, for example an electro-optical system such as reading bar codes and the like.

Thus the present invention describes a method and apparatus for achieving improved spatial resolution and also at least alleviates problems associated with simultaneous electrode activation.

I claim:

1. A method of positional determination within an array of sensor electrodes, the method comprising: activating at least one of the array of sensor electrodes and producing a binary code and a binary error code for each sensor activated; and when two or more sensors are activated simultaneously, combining the binary codes for each activated sensor and combining the binary error codes for each activated sensor, thereby to produce a further code for uniquely defining the position of activation of the activated sensors in the array.

2. A method according to claim 1 wherein the binary code is a Gray code.

3. A method according to claim 2 wherein the array of sensor electrodes are arranged with a predetermined pitch and the binary error codes enable positional determination to within one-half of the sensor electrode pitch.

4. A method according to claim 3 wherein the sensor electrodes are piezoelectric sensors, thereby to provide electrical signals when activated.

5. A method according to claim 1 wherein the array of sensor electrodes are arranged with a predetermined pitch and the binary error codes enable positional determination to within one-half of the sensor electrode pitch.

6. A method according to claim 5 wherein the sensor electrodes are piezoelectric sensor, thereby to provide electrical signals when activated.

7. A method according to claim 1 wherein the sensor electrodes are piezoelectric sensors, thereby to provide electrical signals when activated.

8. A system for positional determination, the system comprising: an array of sensor electrodes capable of being activated and each for providing signals when activated; processing means for producing from the signals from each activated sensor a binary code indicative of the activated sensor, and a binary error code; and further processing means for combining, when two or more sensors are activated simultaneously, the binary codes and the binary error codes for the two or more activated sensors thereby to provide a further code uniquely defining the position of activation of the sensor electrodes in the array.

9. A system according to claim 8 wherein the sensor electrodes comprise piezoelectric electrodes.

10. A system according to claim 8 wherein the system further comprises a plurality of resistors and a plurality of output lines; the plurality of resistors for effecting electrical connection between the sensor electrodes and the plurality of output lines, which output lines are arranged for providing the binary codes.

11. A system according to claim 10 wherein the system further includes, a plurality of further resistors and plurality of further output lines; the plurality of further resistors for effecting electrical connection between the sensor electrodes and the plurality of further output lines, which further output lines are arranged for providing the binary error codes.

12. A system according to claim 9 wherein the system further includes a plurality of further resistors and a plurality of further output lines; the plurality of further resistors for effecting electrical connection between the sensor electrodes and the plurality of further output lines, which further output lines are arranged for providing the binary error codes.

* * * * *